US012800072B2

(12) United States Patent
Voelzke et al.

(10) Patent No.: US 12,800,072 B2
(45) Date of Patent: Nov. 17, 2026

(54) FITTING ADAPTER CONFIGURED TO MAINTAIN ENVIRONMENTAL INTEGRITY AT A CONNECTION POINT

(71) Applicant: Robroy Industries—Texas, LLC, Gilmer, TX (US)

(72) Inventors: Steven A Voelzke, Longview, TX (US); Tabitha Stricklin, Forney, TX (US)

(73) Assignee: Robroy Industries—Texas, LLC

( * ) Notice: Subject to any disclaimer, the term of this patent is extended or adjusted under 35 U.S.C. 154(b) by 205 days.

(21) Appl. No.: 18/748,688

(22) Filed: Jun. 20, 2024

(65) Prior Publication Data

US 2024/0426406 A1 Dec. 26, 2024

Related U.S. Application Data

(60) Provisional application No. 63/509,409, filed on Jun. 21, 2023.

(51) Int. Cl.
*F16L 19/02* (2006.01)

(52) U.S. Cl.
CPC ....... *F16L 19/0237* (2013.01); *F16L 19/0225* (2013.01)

(58) Field of Classification Search
CPC .... H02G 3/0616; H02G 15/013; H02G 3/088; H02G 3/081; H02G 3/06; F16L 19/0237; F16L 19/0225; F16L 21/045; F16L 19/00; F16L 19/0218; H01R 4/643
USPC ........... 174/50.52, 50, 153 G, 152 R, 152 G, 174/68.1, 68.3, 70 C, 95, 137 R, 153 R, 174/653, 650; 248/68.1, 96; 138/118.1; 277/625, 626
See application file for complete search history.

(56) References Cited

U.S. PATENT DOCUMENTS

| | | | | | |
|---|---|---|---|---|---|
| 2,245,154 | A * | 6/1941 | McWane | F16L 47/08 | 277/625 |
| 2,735,700 | A * | 2/1956 | Bowan et al. | F16L 19/061 | 277/625 |
| 2,953,398 | A * | 9/1960 | Haugen | F16L 21/03 | 277/625 |
| 3,236,528 | A * | 2/1966 | Bram | F16L 58/185 | 277/626 |
| 4,692,561 | A * | 9/1987 | Nattel | H02G 15/013 | 174/653 |
| 7,182,372 | B2 * | 2/2007 | Wolff | F16L 21/03 | 277/604 |

(Continued)

*Primary Examiner* — Angel R Estrada
(74) *Attorney, Agent, or Firm* — The Webb Law Firm

(57) ABSTRACT

A fitting adapter for a conduit system includes a body having a first end, a second end, a hollow core, a lip, a recess, a flange, and a gasket formed of a polymeric material, sized and configured to be received by the body, and having a rim. The recess and the flange are sized and configured to receive the rim. The fitting adapter is configured to interact with a conduit or a transition adapter and a conduit body or a device box to form a sealed connection where a conduit or transition adapter is connected to a conduit body or a device box. A conduit system includes a conduit or transition adapter, a conduit body or device box, and a fitting adapter. A method of connecting a conduit or transition adapter to a fitting adapter and a conduit body or device box forms a hygienic and sealed connection therebetween.

20 Claims, 5 Drawing Sheets

(56) References Cited

U.S. PATENT DOCUMENTS

| | | | | |
|---|---|---|---|---|
| 10,951,015 | B2 * | 3/2021 | Kessel | H02G 3/06 |
| 11,774,022 | B2 * | 10/2023 | Larson | F16L 19/065<br>285/339 |

* cited by examiner

FITTING ADAPTER CONFIGURED TO MAINTAIN ENVIRONMENTAL INTEGRITY AT A CONNECTION POINT

CROSS REFERENCE TO RELATED APPLICATION

This application claims the benefit of U.S. Provisional Patent Application No. 63/509,409, which was filed Jun. 21, 2023, the disclosure of which is incorporated by reference herein in its entirety.

BACKGROUND

Field of the Disclosure

The present disclosure relates to a fitting adapter for a conduit system and, more specifically, to a fitting adapter configured to maintain environmental integrity at a connection point between a conduit or a transition adapter and a conduit body or device box.

Description of Related Art

Conduit is a well-known protective covering and routing path for use with electrical wire and cable in both industrial and commercial applications. Electrical installments utilizing conduit typically include lengths of conduit connected to various types of electrical boxes, conduit bodies, and conduit fittings. Conduit is offered in a variety of metal, plastic, and composite materials, and is selected based on the needs of a particular application. Additionally, a multitude of governing bodies promulgate regulations requiring that conduit used in specific applications meets certain minimum requirements. For example, in certain applications, metal conduit and conduit fittings must maintain a minimum level of cleanliness to prevent corrosion, contamination, and bacteria growth thereon.

In specific applications, conduit is used in certain facilities in the food and beverage industry to form "raceways" that hold electrical wire and cable that provide power, control, or data to certain machines and appliances in food and beverage processing facilities, pet food processing facilities, pharmaceutical operations, restaurant or bar kitchens, or similar facilities. Since the conduit may be placed in relatively close proximity to production equipment or tables on which products, food or beverages may be processed, prepared, or stored, regulations are in place that require the conduit maintain a minimum level of sterility to avoid corrosion, contamination, and/or growth of bacteria thereon, which could transfer to any product, food, or beverage being prepared for consumption or use, or being stored on adjacent surfaces.

However, quite often, conduit and conduit fittings will permit such corrosion, contamination, and/or bacteria growth to develop therein. Connections and joints in particular are locations that offer an opportunity for corrosive agents, contamination, and/or bacteria to invade. Due to condensation and possible contact with the food and/or beverage, bacteria and/or contamination of the joint fitting between portions of the conduit often occurs. Water may seep into the joint fitting between the connecting portions of the conduit, helping bacteria to grow therein. Most joint fittings of conduit used in the food and beverage industry do not include features to assist in ensuring that water is directed away from the joint fitting to prevent corrosion, contamination, and bacteria growth. One of the most common exposures occurs at the threads of conduit connections into outlet boxes, conduit bodies, and joint and other fittings. More specifically, and with reference to FIGS. 1A and 1B, when a conduit 1 is connected to a fitting, such as a conduit body 5 or device box 6, a portion of the exposed threads 2, (made from steel or aluminum), of the conduit 1 remains exposed to the environment. This exposure may exist even where the conduit is properly connected to the fitting. Raw exposed steel and aluminum threads provide a location for moisture in the air to condense and result in crevice corrosion and pitting between the protective coatings.

A variety of solutions exist to prevent the exposure of threads at joints. However, such currently available systems suffer from various deficiencies and do not adequately protect the exposed threading.

In view of the foregoing, there exists a need for a fitting adapter for a conduit system configured to maintain environmental integrity at a connection point between a conduit or a transition adapter and a conduit body or device box.

SUMMARY

Accordingly, aspects of the present disclosure are directed to non-limiting embodiments of a fitting adapter configured to maintain environmental integrity at a connection point between a conduit or a transition adapter and a conduit body or device box.

According to an aspect of the disclosure, a fitting adapter includes a body having a first end, a second end, a hollow core, a lip, a recess, and a flange. A fitting adapter further includes a gasket comprising a polymeric material, sized and configured to be received by the body, and having a rim. The recess and the flange are sized and configured to receive the rim, and the fitting adapter is configured to interact with a conduit or a transition adapter and a conduit body or a device box to form a sealed connection where a conduit or transition adapter is connected to a conduit body or a device box.

According to another aspect of the disclosure, a conduit system includes a conduit or a transition adapter comprising a first end, a conduit body or a device box, and a fitting adapter. The fitting adapter includes a body having a first end, a second end, a hollow core, a lip, a recess, and a flange. The fitting adapter further includes a gasket comprising a polymeric material, received by the body, and having a rim. The recess and the flange receive the rim, and the fitting adapter interacts with the conduit or the transition adapter and the conduit body or the device box to form a sealed connection where the conduit or the transition adapter is connected to the conduit body or the device box.

According to another aspect of the disclosure, a method of connecting a conduit or transition adapter to a fitting adapter and a conduit body or device box includes providing a fitting adapter. The fitting adapter includes a body having a first end, a second end, a hollow core, a lip, a recess, and a flange. The fitting adapter further includes a gasket comprising a polymeric material, sized and configured to be received by the body, and having a rim. The recess and the flange are sized and configured to receive the rim. The method further includes inserting a first end of a conduit or a transition adapter into the fitting adapter such that the first end of the conduit or transition adapter extends through the second end of the fitting adapter, and connecting the first end of the conduit or transition adapter into a conduit body or a device box such that a sealed connection is made where the conduit or transition adapter is connected to a conduit body or a device box.

Non-limiting illustrative examples of the embodiments of the present disclosure will now be described in the following numbered clauses.

Clause 1: A fitting adapter for a conduit system, the fitting adapter comprising: a body having a first end, a second end, a hollow core, a lip, a recess, and a flange; and a gasket comprising a polymeric material, sized and configured to be received by the body, and having a rim, wherein the recess and the flange are sized and configured to receive the rim, and wherein the fitting adapter is configured to interact with a conduit or a transition adapter and a conduit body or a device box to form a sealed connection where a conduit or transition adapter is connected to a conduit body or a device box.

Clause 2: The fitting adapter of clause 1, wherein the fitting adapter is sized and configured to allow a first end of the conduit or the transition adapter to pass through the hollow core of the fitting adapter such that the first end of the conduit or the transition adapter at least partially extend from the second end.

Clause 3: The fitting adapter of clause 1 or 2, wherein the gasket is sized and configured to interact and form a sealed connection with the conduit or the transition adapter, and the second end is configured to interact and form a sealed connection with the conduit body or the device box.

Clause 4: The fitting adapter of any of clauses 1-3, wherein the first end of the body comprises the lip, the second end of the body comprises the flange, and the flange further comprises a flange surface.

Clause 5: The fitting adapter of any of clauses 1-4, wherein the flange surface is configured to cover exposed threads of the conduit or the transition adapter.

Clause 6: The fitting adapter of any of clauses 1-5, wherein the flange surface is further configured to threadably engage 1.5 to 2.5 exposed threads of the conduit or the transition adapter.

Clause 7: The fitting adapter of any of clauses 1-6, wherein the gasket further comprises at least two rings connected by a center portion.

Clause 8: The fitting adapter of any of clauses 1-7, wherein a first ring of the at least two rings comprises the rim and is positioned in the recess.

Clause 9: The fitting adapter of any of clauses 1-8, wherein a second ring of the at least two rings is positioned in the lip.

Clause 10: The fitting adapter of any of clauses 1-9, wherein the fitting adapter further comprises a second gasket and the second gasket is position at the second end of the body.

Clause 11: A conduit system, the conduit system comprising: a conduit or a transition adapter comprising a first end; a conduit body or a device box; and a fitting adapter, the fitting adapter comprising: a body having a first end, a second end, a hollow core, a lip, a recess, and a flange; and a gasket comprising a polymeric material, received by the body, and having a rim, wherein the recess and the flange receive the rim, and wherein the fitting adapter interacts with the conduit or the transition adapter and the conduit body or the device box to form a sealed connection where the conduit or the transition adapter is connected to the conduit body or the device box.

Clause 12: The conduit system of clause 11, wherein the conduit further comprises a cylindrical body or wherein the transition adapter further comprises a frustoconical body.

Clause 13: The conduit system of clause 11 or 12, wherein the conduit or the transition adapter comprises exposed threads.

Clause 14: The conduit system of any of clauses 11-13, wherein the first end of the body comprises the lip, the second end of the body comprises the flange, and the flange further comprises a flange surface threadably engaged with 1.5 to 2.5 exposed threads of the conduit or the transition adapter.

Clause 15: The conduit system of any of clauses 11-14, wherein the gasket further comprises at least two rings connected by a center portion, a first ring of the at least two rings comprises the rim and is positioned in the recess, a second ring of the at least two rings is positioned in the lip, and the gasket is sealingly engaged with the conduit or the transition adapter.

Clause 16: A method of connecting a conduit or transition adapter to a fitting adapter and a conduit body or device box, the method comprising: providing a fitting adapter, the fitting adapter comprising: a body having a first end, a second end, a hollow core, a lip, a recess, and a flange; and a gasket comprising a polymeric material, sized and configured to be received by the body, and having a rim, wherein the recess and the flange are sized and configured to receive the rim, and inserting a first end of a conduit or a transition adapter into the fitting adapter such that the first end of the conduit or transition adapter extends through the second end of the fitting adapter; and connecting the first end of the conduit or transition adapter into a conduit body or a device box such that a sealed connection is made where the conduit or transition adapter is connected to a conduit body or a device box.

Clause 17: The method of clause 16, wherein the first end of the conduit or the transition adapter has exposed threads and all exposed threads are covered by the conduit body or the device box, the fitting adapter, or a combination thereof.

Clause 18: The method of clause 16 or 17, wherein the first end of the body comprises the lip, the second end of the body comprises the flange, and the flange further comprises a flange surface.

Clause 19: The method of any of clauses 16-18, wherein the flange surface threadably engages 1.5 to 2.5 exposed threads of the conduit or the transition adapter.

Clause 20: The method of any of clauses 16-19, wherein the gasket interacts and forms a sealed connection with the conduit or the transition adapter and the second end interacts and forms a sealed connection with the conduit body or the device box.

Further details and advantages of the various examples described in detail herein will become clear upon reviewing the following detailed description of the various examples in conjunction with the accompanying drawing figures.

BRIEF DESCRIPTION OF THE DRAWINGS

Additional advantages and details are explained in greater detail below with reference to the exemplary embodiments that are illustrated in the accompanying schematic figures, in which.

Corresponding reference characters indicate corresponding parts throughout the several views. The exemplifications set out herein illustrate exemplary embodiments of the disclosure, and such embodiment are not to be construed as limiting the scope of the disclosure in any manner.

DETAILED DESCRIPTION

Figure 1A:
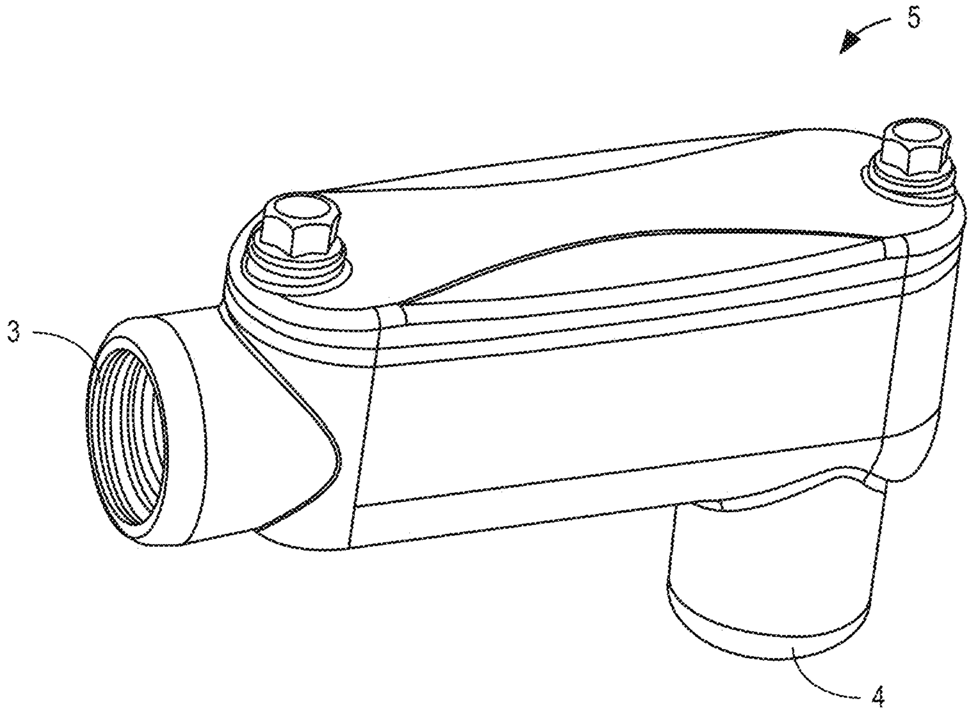
FIG. 1A is a perspective view of an example of a conduit body of a conduit with which a fitting adapter in accordance with present disclosure may interact.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "vertical," "horizontal," "top," "bottom," "lateral," "longitudinal," and derivatives thereof shall relate to embodiments or aspects as they are oriented in the drawing figures. Some non-limiting embodiments or aspects may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." As used in the specification and the claims, the singular form of "a," "an," and "the" include plural referents, such as unless the context clearly dictates otherwise. Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Further, the phrase "based on" is intended to mean "based at least partially on" unless explicitly stated otherwise. In addition, reference to an action being "based on" a condition may refer to the action being "in response to" the condition.

Non-limiting embodiments or aspects of the present disclosure are generally directed to a fitting adapter for a conduit system and, more specifically, to a fitting adapter configured to maintain environmental integrity at a connection point between a conduit or a transition adapter and a conduit body or device box. According to non-limiting embodiments, a fitting adapter according to the present disclosure may include a body having a first end, a second end, a hollow core, a lip, a recess, and a flange. A fitting adapter may further include a gasket comprising a polymeric material, sized and configured to be received by the body, and having a rim. The recess and the flange may be sized and configured to receive the rim, and the fitting adapter may be configured to interact with a conduit or a transition adapter and a conduit body or a device box to form a sealed connection where a conduit or transition adapter may be connected to a conduit body or a device box.

In some non-limiting embodiments, the fitting adapter may be sized and configured to allow a first end of the conduit or the transition adapter to pass through the hollow core of the fitting adapter such that the first end of the conduit or the transition adapter at least partially extend from the second end. In some non-limiting embodiments, the gasket may be sized and configured to interact and form a sealed connection with the conduit or the transition adapter, and the second end may be configured to interact and form a sealed connection with the conduit body or the device box. In some non-limiting embodiments, the first end of the body may comprise the lip, the second end of the body may comprise the flange, and the flange may further comprise a flange surface. In some non-limiting embodiments, the flange surface may be configured to cover exposed threads of the conduit or the transition adapter. In some non-limiting embodiments, the flange surface may further be configured to threadably engage 1.5 to 2.5 exposed threads of the conduit or the transition adapter. In some non-limiting embodiments, the gasket may further comprise at least two rings connected by a center portion. In some non-limiting embodiments, a first ring of the at least two rings may comprise the rim and may be positioned in the recess. In some non-limiting embodiments, a second ring of the at least two rings may be positioned in the lip. In some non-limiting embodiments, the fitting adapter may further comprise a second gasket and the second gasket may be positioned at the second end of the body.

In this way, embodiments of the present disclosure allow for connecting a conduit or a transition adapter to a conduit body or device box to maintain environmental integrity at a connection point between the conduit or transition adapter and the conduit body or device box.

Figure 2A:
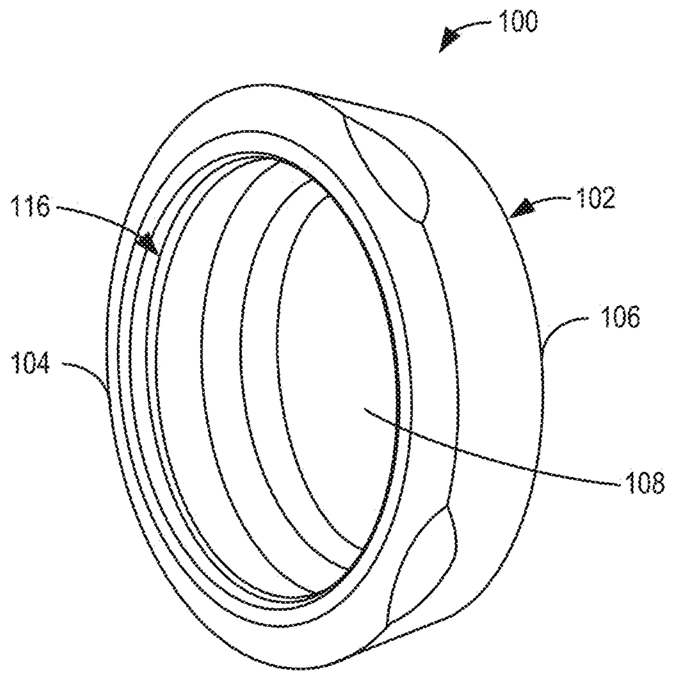
FIG. 2A is a perspective view of a non-limiting embodiment of a fitting adapter in accordance with the present disclosure.
Figure 2B:
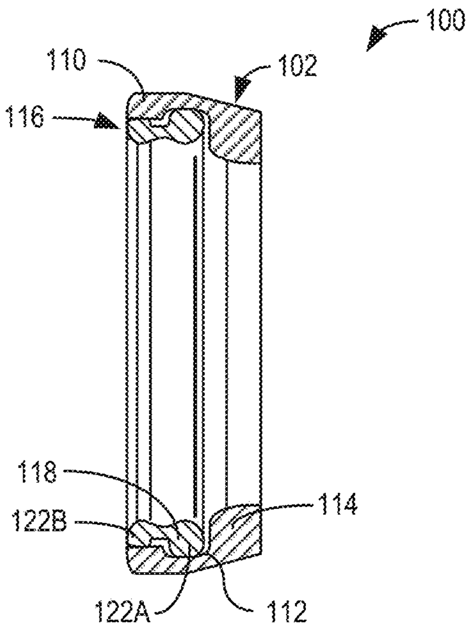
FIG. 2B is a side sectional view of a non-limiting embodiment of a fitting adapter in accordance with the present disclosure.
Figure 5A:
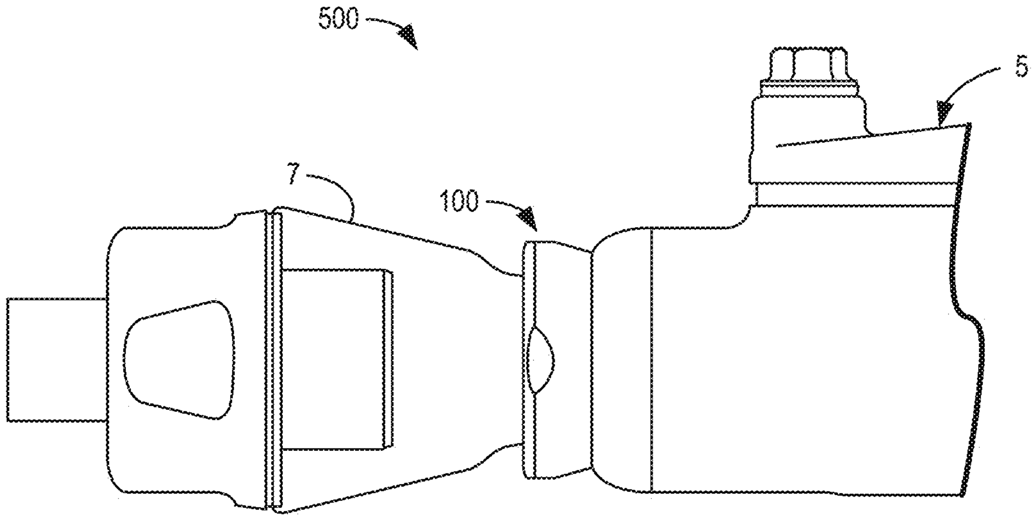
FIGS. 5A and 5B are a side view and a side sectional view of a non-limiting embodiment of a conduit system in accordance with the present disclosure.
Figure 5B:
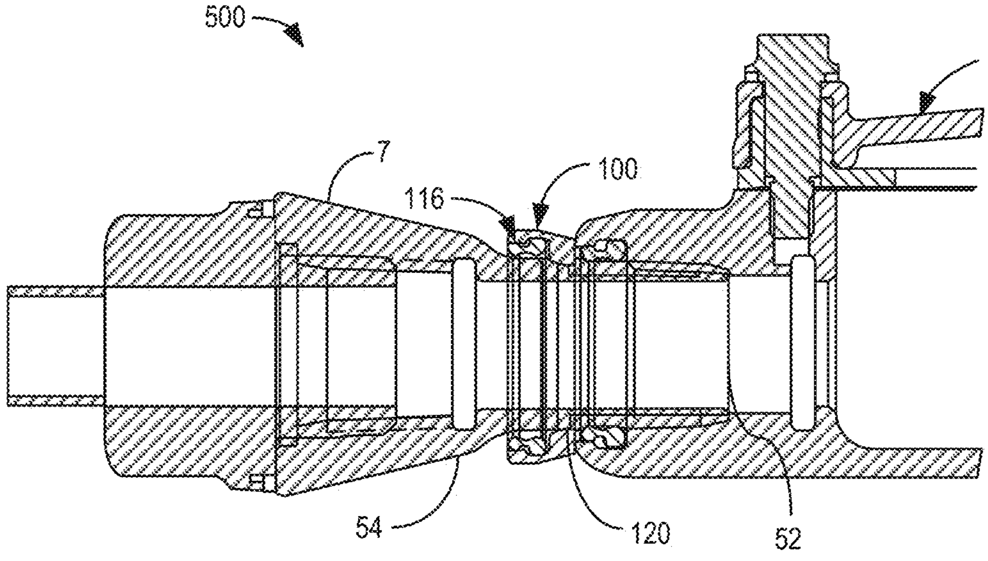

Referring now to FIG. 1A, FIG. 1A is a perspective view of an example of conduit body 5 of a conduit system with which a fitting adapter in accordance with present disclosure may interact. A fitting adapter in accordance with the present disclosure (e.g., fitting adapter 100 as shown in FIGS. 2A-2B) may interact with conduit body 5 of FIG. 1A in a conduit system (e.g., conduit system 500 as shown in FIGS. 5A and 5B) of the present disclosure to form a sealed connection. In some non-limiting embodiments, a fitting adapter may interact with conduit body 5 at a connection point such as first end 3 of conduit body 5 or second end 4 of conduit body 5 in a conduit system to form a sealed connection and maintain environmental integrity of the system.

Figure 1B:
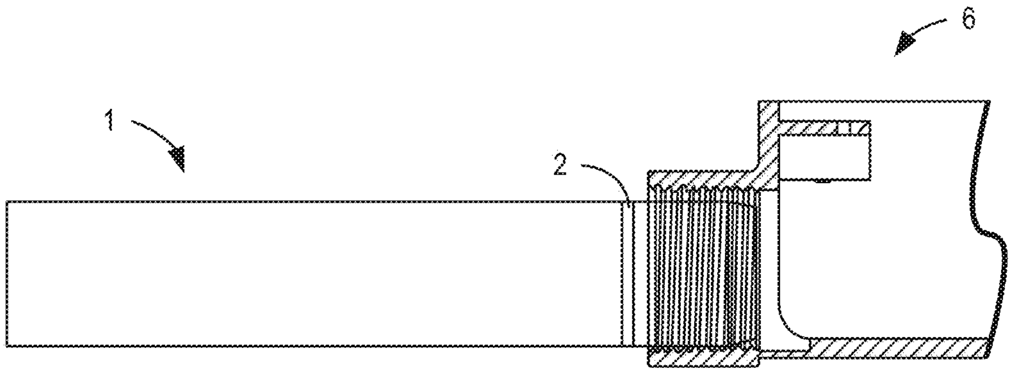
FIG. 1B is a side sectional view of an example of a device box connected to a conduit with exposed threads and without a fitting adapter in accordance with the present disclosure.
Figure 6A:
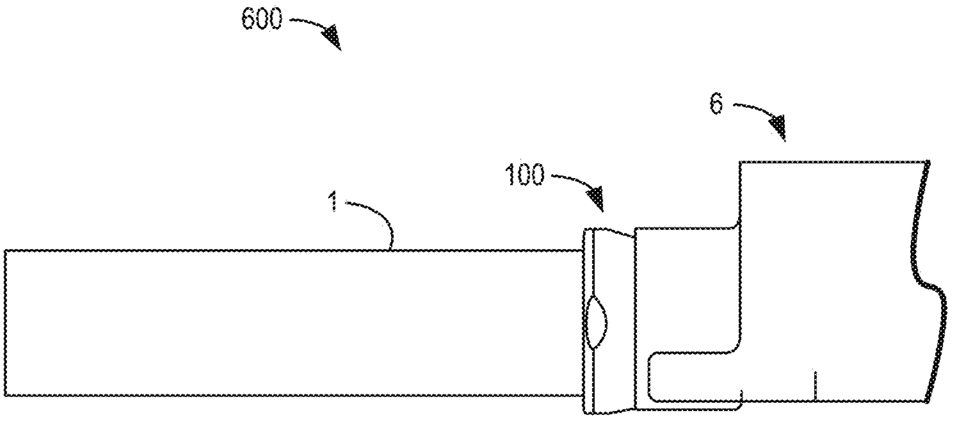
FIGS. 6A and 6B are a side view and a side sectional view of a non-limiting embodiment of a conduit system in accordance with the present disclosure.
Figure 6B:
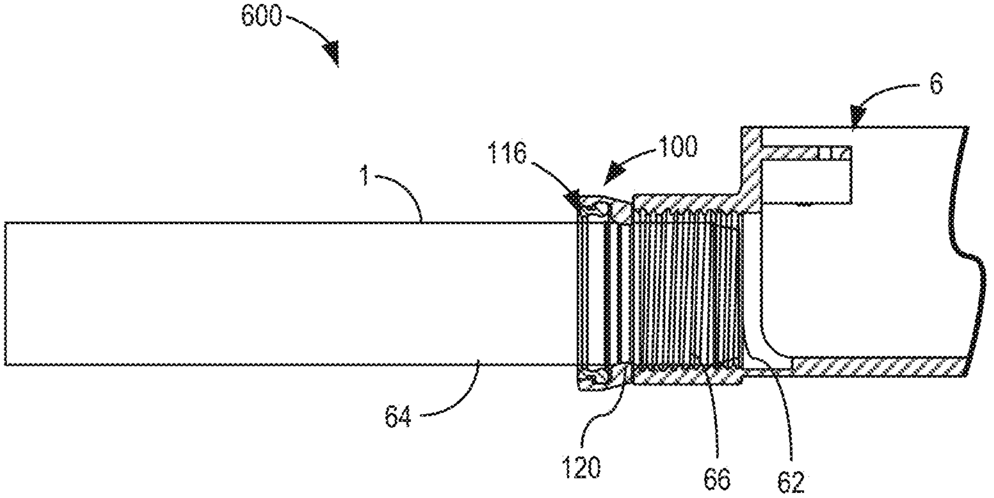

Referring now to FIG. 1B, FIG. 1B is a side sectional view of an example of device box 6 connected to conduit 1 with exposed threads 2 and without a fitting adapter in accordance with the present disclosure. As shown in FIG. 1B, when a conduit 1 is connected to a fitting, such as a conduit body (e.g., conduit body 5 as shown in FIG. 1A) or device box 6, a portion of the exposed threads 2 of the conduit 1, which may be steel, aluminum, or another suitable metal, may remain exposed to the environment. A portion of exposed threads may remain exposed to the environment even where the conduit is properly connected to the fitting. Exposed raw metal threads provide a location for moisture in the air to condense and result in crevice corrosion and pitting. A fitting adapter of the present disclosure, such as fitting adapter 100 shown in FIGS. 2A-2B, implemented in a conduit system, such as conduit system 500 shown in FIGS. 5A-5B or conduit system 600 as shown in FIGS. 6A-6B, may cover exposed threads 2 and form a sealed connection to maintain environmental integrity at a connection point.

Referring now to FIGS. 2A and 2B, FIGS. 2A and 2B are a perspective view and a side sectional view of a non-limiting embodiment of fitting adapter 100 in accordance with the present disclosure. As shown in FIGS. 2A and 2B, fitting adapter 100 may include body 102. Body 102 may include first end 104, second end 106, hollow core 108, lip 110, recess 112, and flange 114. As further shown in FIGS. 2A and 2B fitting adapter 100 may include gasket 116. Gasket 116 may comprise a polymeric material and may be sized and configured to be received by body 102, and gasket 116 may further include rim 118. As further shown in FIGS. 2A and 2B, recess 112 and flange 114 may be sized and configured to receive rim 118 of gasket 116. Fitting adapter 100 may be configured to interact with a conduit (e.g., conduit 1 of FIGS. 1B, 6A and 6B) or a transition adapter (e.g., transition adapter 7 of FIGS. 5A and 5B) and a conduit body (e.g., conduit body 5 of FIGS. 1A, 5A and 5B) or a device box (e.g., device box 6 of FIGS. 1B, 6A and 6B) to form a sealed connection where a conduit or transition adapter is connected to a conduit body or a device box. In some non-limiting embodiments, fitting adapter 100 may be sized and configured to allow a first end of the conduit or the transition adapter to pass through hollow core 108 of fitting adapter 100 such that the first end of the conduit or the transition adapter at least partially extend from second end 106 of body 102. In some non-limiting embodiments, gasket 116 may be sized and configured to interact and form a sealed connection with the conduit or the transition adapter, and second end 106 may be configured to interact and form a sealed connection with the conduit body or the device box. To facilitate the sealed connection with the conduit body or the device box, second end 106 may include a flat surface. In some non-limiting embodiments, second end 106 may include a concave surface, which may concave in to second end 106 toward body 102, or may concave out of second end 106, extending from body 102.

Figure 3:
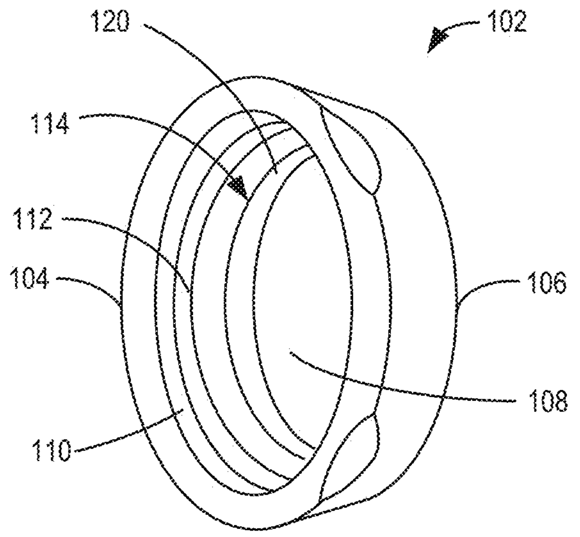
FIG. 3 is a perspective view of a non-limiting embodiment of a body of a fitting adapter in accordance with the present disclosure.

Referring now to FIG. 3, FIG. 3 is a perspective view of a non-limiting embodiment of body 102 of fitting adapter 100 in accordance with the present disclosure. FIG. 3 further shows first end 104, second end 106, hollow core 108, lip 110, recess 112, and flange 114 of body 102. In some non-limiting embodiments, as shown in FIG. 3, first end 104 of body 102 may comprise lip 110, second end 104 of body 102 may comprises flange 114, and flange 114 may further include flange surface 120. In some non-limiting embodiments, flange surface 120 may be configured to cover exposed threads of the conduit or the transition adapter. In some non-limiting embodiments, flange surface 120 may be further configured to threadably engage 1.5 to 2.5 exposed threads of the conduit or the transition adapter. In some non-limiting embodiments, body 102 may further comprise a uniform cylindrical outer portion with a taper toward first end 104 and a taper toward second end 102. Further, in some embodiments, body 102 may comprise a frustoconical outer portion. Said frustoconical outer portion may be defined by a taper from the uniform cylindrical portion to second end 106. In some non-limiting embodiments, body 102 may further comprise gripping features positioned on an exterior surface of body 102. The gripping features may provide a location for a user to grip body 102 of fitting adapter 100, either by hand or with a tool such as a wrench, to connect the fitting adapter to a conduit or transition adapter and a conduit body or device box.

Figure 4:
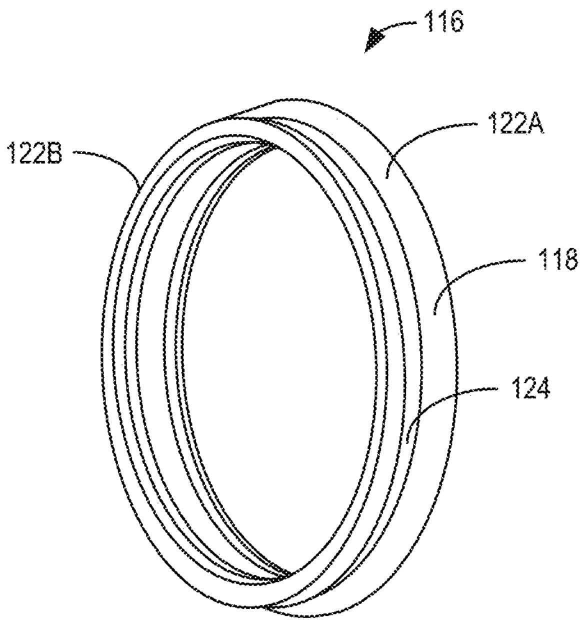
FIG. 4 is a perspective view of a non-limiting embodiment of a gasket of a fitting adapter in accordance with the present disclosure.

Referring now to FIG. 4, FIG. 4 is a perspective view of a non-limiting embodiment of gasket 116 of fitting adapter 100 in accordance with the present disclosure. FIG. 4 further shows rim 118 of gasket 116. In some non-limiting embodiments, as shown in FIGS. 2B and 4, gasket 116 may further comprise at least two rings 122A, 122B connected by a center portion 124. In some non-limiting embodiments, center 124 may include a flat outer surface and a curvilinear inner surface. In some non-limiting embodiments, first ring 122A of the at least two rings 122A, 122B may include rim 118, and rim 118 may be positioned in recess 112. In some non-limiting embodiments, second ring 122B of at least two rings 122A, 122B may be positioned in lip 110.

In some non-limiting embodiments, fitting adapter 100, may further include a second gasket (not shown) and the second gasket may be positioned at second end 106 of body 102. The second gasket my be the same or similar to gasket 116. In some non-limiting embodiments, the second gasket may be an O-ring. In other embodiments, the second gasket may comprise a thin cylindrical ring, a thin frustoconical ring, or a flat ring, Where fitting adapter 100 having a second gasket is included in a system (e.g., system 500 of FIGS. 5A-5B or system 600 of FIGS. 6A-6B), the second gasket may be positioned between the fitting adapter 100 and the conduit body (i.e., conduit body 5) or device box (i.e., device box 6) to form a sealed connection.

In some non-limiting embodiments, the polymeric material may be silicone. In other non-limiting embodiments, the polymeric may be another suitable polymer, such as polyvinyl chloride (PVC) or propylene diene terpolymer (EPDM). In other embodiments, the polymeric material may be any suitable polymer that exhibits the necessary flexibility, resilience, chemical resistance, and strength for protecting and sealing metallic components.

Referring now to FIGS. 5A and 5B, FIGS. 5A and 5B are a side view and a side sectional view of a non-limiting embodiment of conduit system 500 in accordance with the present disclosure. As shown in FIGS. 5A and 5B, conduit system 500 may include transition adapter 7, conduit body 5, and fitting adapter 100. Transition adapter 7 may include first end 52. As further shown in FIGS. 5A and 5B fitting adapter 100 may interact with transition adapter 7 and conduit body 5 to form a sealed connection where transition adapter 7 is connected to conduit body 5.

In some non-limiting embodiments, transition adapter 7 may further include frustoconical body 54. In some non-limiting embodiments, transition adapter 7 may have exposed threads. In some non-limiting embodiments, flange surface 120 of fitting adapter 100 may cover exposed threads of transition adapter 7. In some non-limiting embodiments, flange surface 120 of fitting adapter 100 may be threadably engaged with exposed threads of transition adapter 100. In some non-limiting embodiments, flange surface 120 of fitting adapter 100 may be threadably engaged with 1.5 to 2.5 exposed threads of transition adapter 100. In some non-limiting embodiments, flange surface 120 of fitting adapter 100 may be sealingly engaged with frustoconical body 54 at first end 52 of transition adapter 7. In some non-limiting embodiments, gasket 116 may be sealingly engaged with transition adapter 7, such as with frustoconical body 54 of transition adapter 7.

Referring now to FIGS. 6A and 6B, FIGS. 6A and 6B are a side view and a side sectional view of a non-limiting embodiment of conduit system 600 in accordance with the present disclosure. As shown in FIGS. 6A and 6B, conduit system 600 may include conduit 1, device box 6, and fitting adapter 100. Conduit 1 may have first end 62. As further shown in FIGS. 6A and 6B fitting adapter 100 may interact with conduit 1 and device box 6 to form a sealed connection where conduit 1 is connected to device box 6.

In some non-limiting embodiments, conduit 1 may further include cylindrical body 64. In some non-limiting embodiments, conduit 1 may have exposed threads. In some non-limiting embodiments, flange surface 120 of fitting adapter 100 may cover exposed threads 66 of conduit 1. In some non-limiting embodiments, flange surface 120 of fitting adapter 100 may be threadably engaged with exposed threads 66 of conduit 1. In some non-limiting embodiments, flange surface 120 of fitting adapter 100 may be threadably engaged with 1.5 to 2.5 exposed threads of exposed threads 66 of conduit 1. In some non-limiting embodiments, flange surface 120 of fitting adapter 100 may be sealingly engaged with cylindrical body 64 at first end 62 of conduit 1. In some non-limiting embodiments, gasket 116 may be sealingly engaged with conduit 1, such as with cylindrical body 64 of conduit 1.

In some non-limiting embodiments of the present disclosure, connecting a conduit or transition adapter to a fitting adapter and a conduit body or device box is disclosed. Using this method, an electrical conduit raceway system may be assembled to hold an electrical wire or cable and to maintain sealed connections and environmental integrity of the conduit system. The following method may be used to form an electrical conduit raceway system using any combination of the conduit, transition adapter, and fittings, including the conduit body and device box, described above. Therefore, specific reference numerals for the specific components are not provided with the following description.

In a first step of the method, a fitting adapter may be provided. The fitting adapter may include a body and the body may include a first end, a second end, a hollow core, a lip, a recess, and a flange. The fitting adapter may also include a gasket made of a polymeric material, and the gasket may be sized and configured to be received by the body, and the gasket may further include a rim. The recess and the flange may be sized and configured to receive the rim. In some non-limiting embodiments, a conduit, conduit portion, or transition adapter may be provided, and a conduit or transition adapter may include a first end. A conduit or transition adapter may also be coated. In some non-limiting embodiments, a conduit body, joint fitting, or device box may be provided.

The first end of the conduit or transition adapter may then be inserted into the fitting adapter such that the first end of the conduit or transition adapter may extend through the second end of the fitting adapter. The first end of the conduit or transition adapter may then be connected into the conduit body or device box such that a sealed connection is made where the conduit or transition adapter is connected to a conduit body or a device box.

In some non-limiting embodiments, electrical wire or cable may then be inserted through the conduit or transition adapter and the conduit body or device box. It is to be understood that the method may alternatively include threading the electrical wire or cable through the conduit or transition adapter before connecting the conduit or transition adapter to the conduit body or device box.

In some non-limiting embodiments, the first end of the conduit or the transition adapter has exposed threads, and all exposed threads are covered by the conduit body or the device box, the fitting adapter, or a combination thereof. In some non-limiting embodiments, the first end of the body of the fitting adapter comprises the lip, the second end of the body comprises the flange, and the flange further comprises a flange surface. In some non-limiting embodiments, the flange surface may be threadably engaged to 1.5 to 2.5 exposed threads of the conduit or the transition adapter. In some non-limiting embodiments, the gasket interacts and forms a sealed connection with the conduit or the transition adapter, and the second end interacts and forms a sealed connection with the conduit body or the device box.

While several examples of the fitting adapter and the conduit system are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

What is claimed is:

1. A fitting adapter for a conduit system, the fitting adapter comprising:

a body having a first end, a second end, a hollow core, a lip, a recess, and a flange; and a gasket comprising a polymeric material, sized and configured to be received by the body, and having a rim, wherein the recess and the flange are sized and configured to receive the rim, and wherein the fitting adapter is configured to interact with both:

a) a conduit or a transition adapter, and b) a conduit body or a device box, to form a sealed connection where a) the conduit or the transition adapter is connected to b) the conduit body or the device box.

2. The fitting adapter of claim 1, wherein the fitting adapter is sized and configured to allow a first end of the conduit or the transition adapter to pass through the hollow core of the fitting adapter such that the first end of the conduit or the transition adapter at least partially extend from the second end.

3. The fitting adapter of claim 2, wherein the gasket is sized and configured to interact and form a sealed connection with the conduit or the transition adapter, and the second end is configured to interact and form a sealed connection with the conduit body or the device box.

4. The fitting adapter of claim 1, wherein the first end of the body comprises the lip, the second end of the body comprises the flange, and the flange further comprises a flange surface.

5. The fitting adapter of claim 4, wherein the flange surface is configured to cover exposed threads of the conduit or the transition adapter.

6. The fitting adapter of claim 5, wherein the flange surface is further configured to threadably engage 1.5 to 2.5 exposed threads of the conduit or the transition adapter.

7. The fitting adapter of claim 1, wherein the gasket further comprises at least two rings connected by a center portion.

8. The fitting adapter of claim 7, wherein a first ring of the at least two rings comprises the rim and is positioned in the recess.

9. The fitting adapter of claim 8, wherein a second ring of the at least two rings is positioned in the lip.

10. The fitting adapter of claim 1, wherein the fitting adapter further comprises a second gasket and the second gasket is positioned at the second end of the body.

11. A conduit system, the conduit system comprising:

a conduit or a transition adapter comprising a first end;

a conduit body or a device box; and a fitting adapter, the fitting adapter comprising:

a body having a first end, a second end, a hollow core, a lip, a recess, and a flange; and a gasket comprising a polymeric material, received by the body, and having a rim, wherein the recess and the flange receive the rim, and wherein the fitting adapter interacts with both:

a) the conduit or the transition adapter, and b) the conduit body or the device box, to form a sealed connection where a) the conduit or the transition adapter is connected to b) the conduit body or the device box.

12. The conduit system of claim 11, wherein the conduit further comprises a cylindrical body or wherein the transition adapter further comprises a frustoconical body.

13. The conduit system of claim 12, wherein the conduit or the transition adapter comprises exposed threads.

14. The conduit system of claim 13, wherein the first end of the body comprises the lip, the second end of the body comprises the flange, and the flange further comprises a flange surface threadably engaged with 1.5 to 2.5 exposed threads of the conduit or the transition adapter.

15. The conduit system of claim 11, wherein the gasket further comprises at least two rings connected by a center portion, a first ring of the at least two rings comprises the rim and is positioned in the recess, a second ring of the at least two rings is positioned in the lip, and the gasket is sealingly engaged with the conduit or the transition adapter.

16. A method of connecting a conduit or a transition adapter to a fitting adapter and a conduit body or a device box, the method comprising:

providing a fitting adapter, the fitting adapter comprising:

a body having a first end, a second end, a hollow core, a lip, a recess, and a flange; and a gasket comprising a polymeric material, sized and configured to be received by the body, and having a rim, wherein the recess and the flange are sized and configured to receive the rim;

inserting a first end of a) a conduit or a transition adapter into the first end of the fitting adapter such that the first end of a) the conduit or the transition adapter extends through the second end of the fitting adapter; and connecting the first end of a) the conduit or the transition adapter into b) a conduit body or a device box such that a sealed connection is made where a) the conduit or the transition adapter is connected to b) the conduit body or the device box.

17. The method of claim 16, wherein the first end of the conduit or the transition adapter has exposed threads and all exposed threads are covered by the conduit body or the device box, the fitting adapter, or a combination thereof.

18. The method of claim 16, wherein the first end of the body comprises the lip, the second end of the body comprises the flange, and the flange further comprises a flange surface.

19. The method of claim 16, wherein the flange surface threadably engages 1.5 to 2.5 exposed threads of the conduit or the transition adapter.

20. The method of claim 16, wherein the gasket interacts and forms a sealed connection with the conduit or the transition adapter, and the second end interacts and forms a sealed connection with the conduit body or the device box.

* * * * *